United States Patent
Hallman

(10) Patent No.: US 6,666,906 B2
(45) Date of Patent: Dec. 23, 2003

(54) GAS DEHYDRATION USING MEMBRANE AND POTASSIUM FORMATE SOLUTION

(75) Inventor: John H. Hallman, New Waverly, TX (US)

(73) Assignee: Clearwater International, L.L.C., Houston, TX (US)

( * ) Notice: Subject to any disclaimer, the term of this patent is extended or adjusted under 35 U.S.C. 154(b) by 0 days.

(21) Appl. No.: 09/992,161

(22) Filed: Nov. 6, 2001

(65) Prior Publication Data
US 2002/0053285 A1 May 9, 2002

Related U.S. Application Data
(60) Provisional application No. 60/246,901, filed on Nov. 8, 2000.

(51) Int. Cl.$^7$ .......................... B01D 53/22; B01D 53/26
(52) U.S. Cl. .................. 95/52; 95/44; 95/231; 96/5; 96/8
(58) Field of Search .............. 95/44, 52, 231; 96/5, 8, 10

(56) References Cited

U.S. PATENT DOCUMENTS

| | | | |
|---|---|---|---|
| 3,735,558 A | | 5/1973 | Skarstrom et al. |
| 3,953,566 A | | 4/1976 | Gore |
| 4,110,392 A | * | 8/1978 | Yamazaki .................. 264/127 |
| 4,187,390 A | | 2/1980 | Gore |
| 4,194,041 A | * | 3/1980 | Gore et al. ................. 428/315 |
| 4,497,640 A | | 2/1985 | Fournie et al. |
| 4,718,921 A | | 1/1988 | Makino et al. |
| 4,750,918 A | * | 6/1988 | Sirkar .......................... 55/16 |
| 4,783,201 A | | 11/1988 | Rice et al. |
| 4,900,448 A | * | 2/1990 | Bonne et al. ............... 210/637 |
| 5,013,436 A | * | 5/1991 | Lee et al. ................. 210/321.8 |
| 5,034,025 A | | 7/1991 | Overmann |
| 5,067,971 A | | 11/1991 | Bikson et al. |
| 5,135,547 A | * | 8/1992 | Tsou et al. ...................... 55/16 |
| 5,183,513 A | * | 2/1993 | Sajewski .................. 134/22.12 |
| 5,184,576 A | * | 2/1993 | Sajewski ..................... 122/26 |
| 5,188,090 A | | 2/1993 | Griggs |
| 5,205,842 A | | 4/1993 | Prasad |
| 5,236,474 A | * | 8/1993 | Schofield et al. .............. 95/47 |
| 5,239,948 A | * | 8/1993 | Sajewski ..................... 122/26 |
| 5,259,869 A | | 11/1993 | Auvil et al. |
| 5,281,254 A | | 1/1994 | Birbara et al. |
| 5,382,364 A | | 1/1995 | Bowser et al. |
| 5,385,298 A | * | 1/1995 | Griggs ........................ 237/1 R |
| 5,399,188 A | | 3/1995 | Roberts |
| 5,407,467 A | | 4/1995 | Lokhandwala et al. |
| 5,632,805 A | | 5/1997 | Woodard |
| 5,681,433 A | | 10/1997 | Friesen et al. |
| 5,725,637 A | | 3/1998 | Gavlin et al. |
| 5,749,941 A | | 5/1998 | Jansen et al. |
| 5,846,450 A | | 12/1998 | Atkinson |
| 5,853,458 A | | 12/1998 | Gavlin et al. |
| 5,876,486 A | * | 3/1999 | Steinwandel et al. .......... 95/44 |
| 5,922,109 A | * | 7/1999 | Rooney et al. ............... 95/231 |
| 5,928,409 A | * | 7/1999 | Sirkar ........................... 95/45 |
| 5,954,858 A | * | 9/1999 | Peretti et al. .................. 95/44 |
| 5,957,122 A | * | 9/1999 | Griggs ........................ 126/247 |
| 6,027,546 A | * | 2/2000 | Kusters et al. ................. 95/52 |
| 6,156,096 A | * | 12/2000 | Sirkar ........................... 95/44 |
| 6,228,145 B1 | | 5/2001 | Falk-Pedersen et al. |

OTHER PUBLICATIONS

Stookey, Jones, Kalthod and Johannessen, "Membrane Dehydrators—A New Alternative for Drying High Pressure Gases," Permea, Inc. (St. Louis MO), p. 2–15, No date.

Falk–Pedersen and Dannstrom, "A Gas–Liquid Membrane Contactor for Natural Gas Treatment," Kvaerner Oil and Gas (Internet), (Feb. 1, 2000).

* cited by examiner

*Primary Examiner*—Robert H. Spitzer
(74) *Attorney, Agent, or Firm*—Moser, Patterson & Sheriden, L.L.P.

(57) ABSTRACT

Potassium or other alkali metal formate solution is used to absorb moisture from gas through a membrane. The membrane may be supported on permeable tubes, and the potassium or other alkali metal formate may be regenerated for reuse, preferably by a cavitation regenerator. The potassium or other alkali metal formate should be present as a 40–80% solution, most preferably 70–76%. The process is especially useful for the dehydration of natural gas.

17 Claims, 5 Drawing Sheets

GAS DEHYDRATION USING MEMBRANE AND POTASSIUM FORMATE SOLUTION

RELATED APPLICATION

This application claims the benefit of Provisional Application 60/246,901 filed Nov. 8, 2000.

TECHNICAL FIELD

This invention relates to the use of solutions of potassium formate to dehydrate gas by contacting one side of a membrane with the gas and the other side with the potassium formate solution. After absorbing moisture from the gas, the solution is regenerated and recirculated for reuse. The invention is particularly useful for dehydrating natural gas.

BACKGROUND OF THE INVENTION

Glycols, especially triethylene glycol, are used to absorb moisture from natural gas, commonly by direct contact in a tower or the like. After absorbing water from the gas, the glycol solutions are usually regenerated by heating them to evaporate the water; the glycol is then returned to the water absorption unit to absorb more moisture. Inevitably, the environment is exposed to the glycol solutions used in gas dehydration. Glycols are generally environmentally undesirable. An article at pages 59–79 of Chapter 6, Section 2 of the Engineering Data Books of the Gas Producers Society of America, entitled "Glycol Dehydration", describes a typical gas drying and solution regeneration system, and some of the problems that can arise with such systems, such as pump failures, leaks, maintaining regeneration temperatures, flooding of the dehydrators, inefficient glycol compositions, plugged trays, and others. Nevertheless, such systems are widely used. A typical prior art gas drying and glycol regeneration system is shown in FIG. 1 hereof in a simplified form.

A more environmentally acceptable gas drying medium and process is needed. The water absorption medium should be efficient and readily regenerable with a minimum of maintenance, as many gas drying units are placed in remote locations.

Gas separation through membranes is generally known. In terms of structure, two general types of membrane separators are commonly used—hollow fibers, which are usually unsupported, and self-supporting membranes or membrane films laid down on a permeable support; the support is usually either tubular or planar. Commonly the membrane is designed or selected to remove the components of interest efficiently while retaining other components—see for example Yamazaki U.S. Pat. No. 4,110,392. Porous membrane products are described by Gore in U.S. Pat. No. 4,187,390, Gore and Allen in U.S. Pat. No. 4,194,041, and Gore in U.S. Pat. No. 3,953,566. Removal of permeate from the permeate side is commonly assisted by a sweep gas.

The use of a membrane between a gaseous feed and a liquid absorbent is unusual. See, as examples, Jansen and Feron U.S. Pat. No. 5,749,941, Birbara and Nalette U.S. Pat. No. 5,281,254, and Falk-Pedersen and Dannstrom U.S. Pat. No. 6,228,145. The choice of a liquid absorbent for its ability to absorb the target component through a membrane is also rare. See Bowser and Dennison U.S. Pat. No. 5,382,364.

Potassium formate is proposed for use together with glycols in a countercurrent direct contact system by Gavlin and Goltsin in U.S. Pat. No. 5,725,637-see lines 25–32 of column 3. See also Gavlin and Goltsin U.S. Pat. No. 5,853,458. Atkinson, in U.S. Pat. No. 5,846,450, uses potassium formate solutions as absorbents in refrigeration systems.

SUMMARY OF THE INVENTION

This invention uses an aqueous alkali metal formate solution to dehydrate natural gas by placing the solution on one side of a membrane and the gas to be dehydrated on the other side. Moisture passes from the gas through the membrane and is readily absorbed by the alkali metal formate solution. In a preferred form of my invention, the membrane is supported on the outside, or shell side, of a permeable tubular surface and the alkali metal, preferably potassium, formate solution is circulated on the inside of the membrane-coated tube while the gas passes countercurrently in contact with the outside, or shell side, of the tube. The process can be run in the opposite manner, however, with the gas flowing through the inside of the tubes, preferably lined with the membrane, while the potassium formate solution contacts the tube on its shell or exterior side. The membrane may be coated or otherwise placed on either the inside or the outside of the permeable tube support. Generally, however, it is desirable for the gas to contact the membrane directly, so the flow of moisture through the membrane will be less likely to dislodge or erode the membrane from the tube surface at a weakly adhering point. Where the pressure difference between the gas and solution is of little consequence, a support need not be used—that is, the membrane is self-supporting and the moisture is transmitted directly through it without having also to traverse a permeable support. In any case, the potassium or other alkali metal formate solution, having been diluted by the absorbed moisture, is then regenerated in any suitable manner.

Regeneration of the diluted solution of potassium or other alkali metal formate is simply the removal of water. Regeneration can be performed in a generally known manner by a reboiler or, preferably, a shock wave regenerator (sometimes known as a cavitation pump), as described in Sajewski's U.S. Pat. Nos. 5,183,513, 5,184,576 and 5,239,948 and Griggs' U.S. Pat. Nos. 5,385,298, 5,957,122 and 5,188,090, all of which are incorporated herein by reference in their entireties. A preferred cavitation regenerator is based on these patents and may be obtained from Hydro Dynamics, Inc. of Rome, Ga. Regeneration can also be performed by a membrane separator utilizing a membrane selected for its ability to transmit water from the dilute solution to the permeate side while retaining the potassium formate.

For the gas dehydration step I may use a membrane in any physical form which permits contacting the gas to be dehydrated on one side and the potassium or other alkali metal formate solution on the other side. The structure may be tubular, laminar, or of any other suitable type, or comprise the entire structure, as a hollow tube, and the membrane may be held by a separate permeable support or not; the solution may be inside a tube or outside (where there is a permeable support for the membrane, the gas is usually under pressure on the same side); in any case the contact of the gas on one side of the membrane and the potassium or other alkali metal formate solution on the other side of the membrane may be continuous, batch, countercurrent, or otherwise suitably arranged. Suitable membranes are described by Woodard in U.S. Pat. No. 5,632,805, Auvil et al in U.S. Pat. No. 5,259,869, Fournie et al in U.S. Pat. No. 4,497,640 and Makino et al in U.S. Pat. No. 4,718,921, and particularly Gore in U.S. Pat. No. 3,953,566, the concepts of which are useful in my invention in their entireties; in their background sections as well as their new disclosures, these patents describe membranes and devices which persons skilled in the art will recognize as having compositions and configurations generally useful in my invention.

Any membrane capable of passing moisture from natural gas to a liquid absorbent for water may be used in my invention. Preferably the membrane will have a moisture transmission rate exceeding 1000 g/m$^2$/day, will permit no detectable flow of liquid water at hydrostatic pressures up to 172 kN/m$^2$/day, and will exclude hydrocarbons such as methane from transmission. While liquid glycols could be used as the liquid absorbent because of their ability to absorb moisture, I prefer to use alkali metal formate solutions; potassium formate solutions are preferred primarily for environmental reasons.

DETAILED DESCRIPTION OF THE INVENTION

My invention utilizes an aqueous solution of alkali metal, preferably potassium formate, which is environmentally benign, to absorb water permeated through a membrane from a stream of natural gas. The potassium or other alkali metal formate is dissolved in water initially in any effective concentration. Efficient concentrations include from 40% to 80% by weight, preferably from 60% to 80%, and most preferably from 70% to 76% by weight potassium or other alkali metal formate. The gas dehydration apparatus may have the general organization of the kind described in the chapter entitled "Dehydration of Natural Gas" pages 63–70, in Arnold and Stewart's, "Surface Production Operations", v.1. See particularly FIG. 5.1, showing a glycol moisture absorber of the prior art and circulation of the wet glycol solution to a reboiler and water stripper. By "general organization", I mean there is a dehydrating section and a regeneration section, as reviewed with respect to the simplified flow sheet of FIG. 1.

Figure 1:
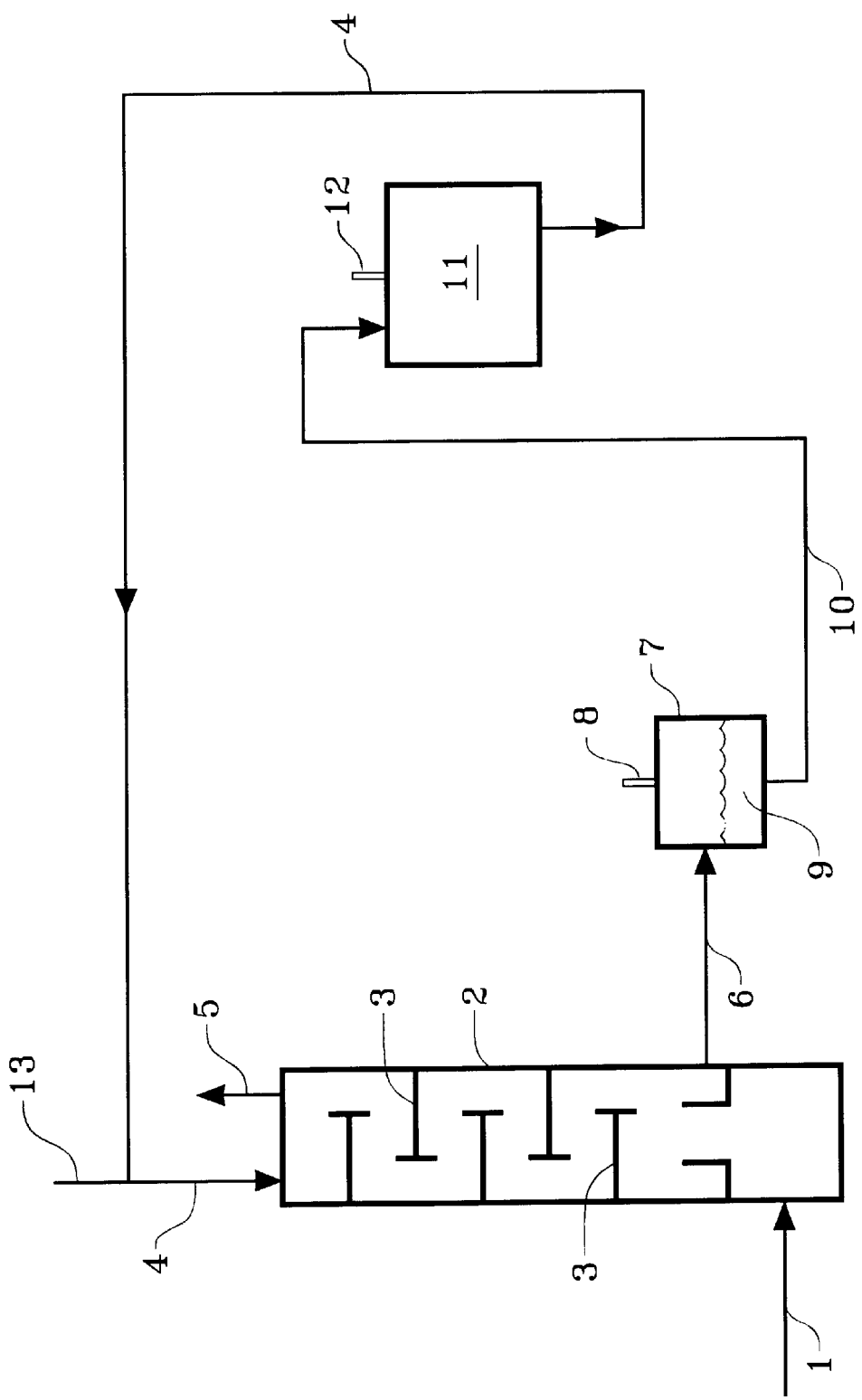
FIG. 1 is a simplified outline of a prior art system for dehydrating natural gas by the use of a glycol solution in an absorption tower.

In the simplified prior art system of FIG. 1 hereof, "wet" natural gas—that is, the natural gas to be dehydrated—continuously or intermittently enters tower 2 through line 1 and ascends through perforated bubble plates 3 to the top and exits tower 2 in line 5 as dry gas, usually to be further transported, but of course it may be used for any conventional or nonconventional purpose for natural gas, particularly where dryness is desirable. In the prior art process, a conventional glycol or glycol solution or mixture is introduced continuously or intermittently into the tower 2 through line 4. The glycol or glycol solution is permitted to trickle through the perforated bubble plates 3 in tower 2, where it picks up moisture from the natural gas by contacting it as the gas rises in the tower 2. The glycol solution thus becomes diluted with the water it picks up from the natural gas; this diluted glycol solution is sent through line 6 usually to a flash drum 7 which may permit water vapor or steam to escape through vent 8. The dilute glycol solution 9 is then sent through line 10 to a conventional reboiler 11 where it is heated to evaporate water vented through line 12. Glycol solution restored by the reboiler 11 to a desired concentration is returned through line 4 to the tower 1 where the process is repeated. Instead of the gas contacting system described by Arnold and Stewart, or the tower 2 shown in FIG. 1 hereof, my invention utilizes a membrane placed between the wet gas and a solution of potassium formate (instead of the glycol solution), as shown in the block diagram of FIG. 2.

Figure 2:
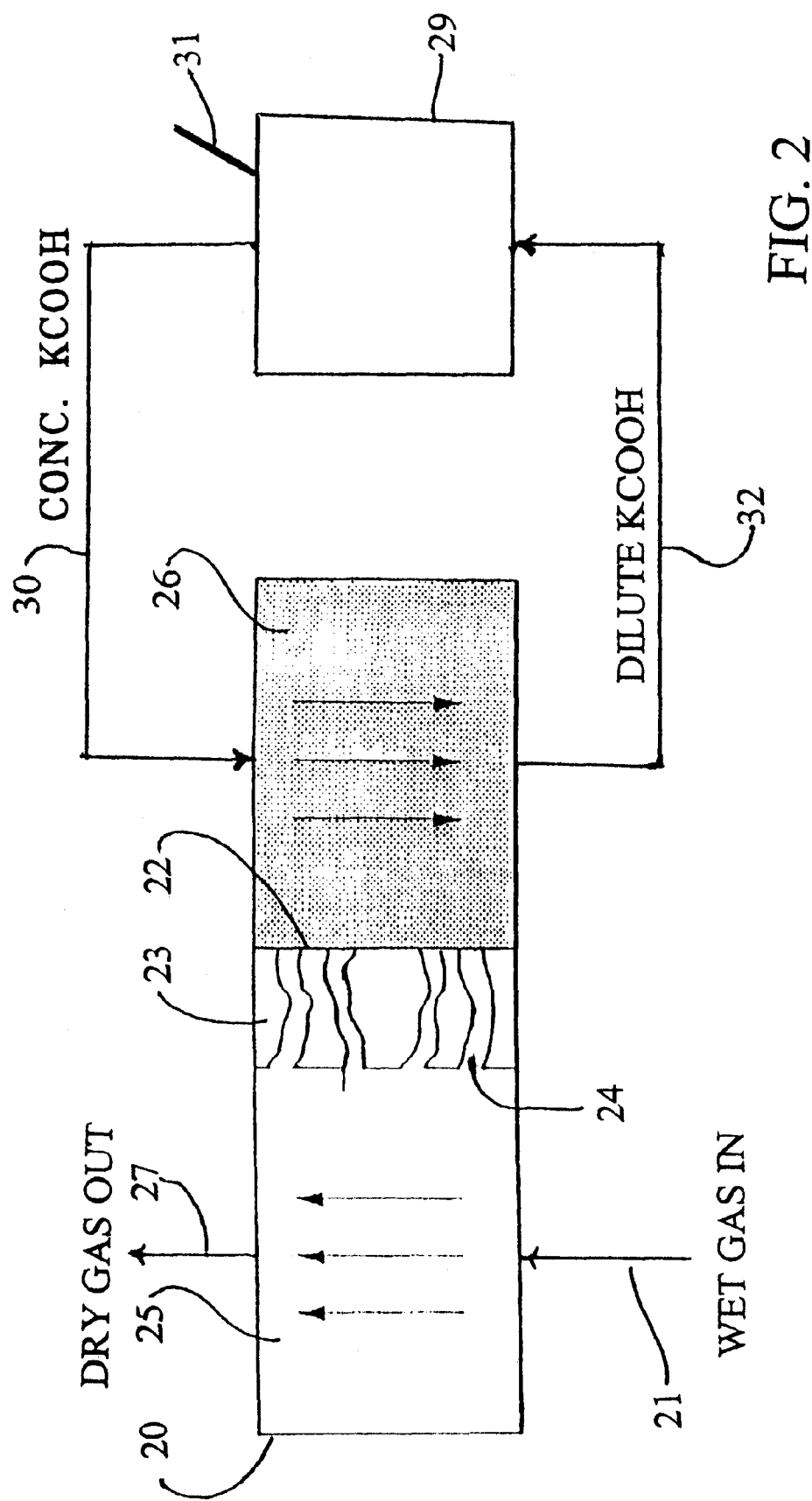
FIG. 2 is a simplified flowsheet of a system of my invention, using a membrane separator for the dehydration step, a potassium formate solution for the moisture absorber, and a solution regenerator.
Figure 4A:
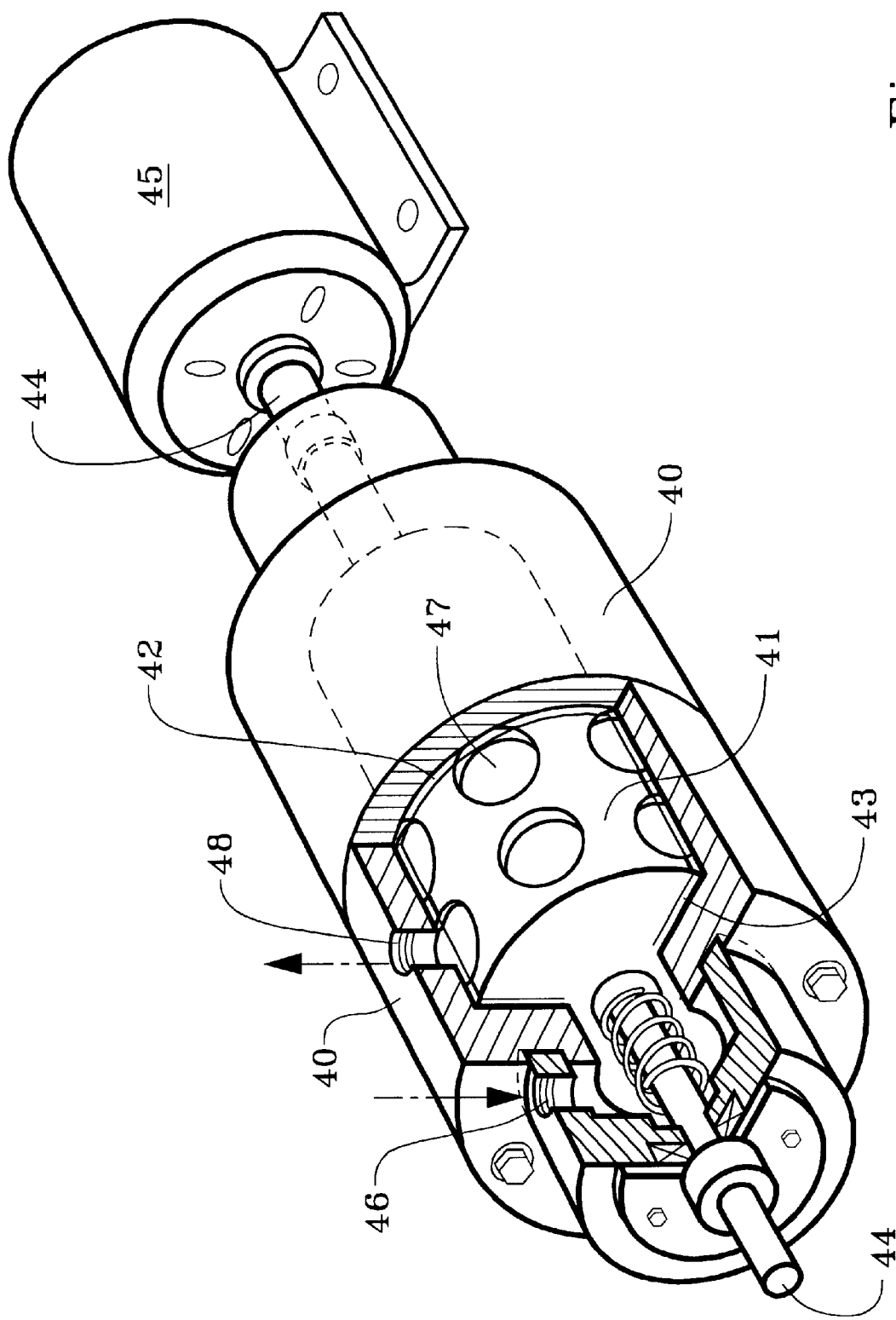
FIGS. 4a and 4b illustrate a cavitation regenerator preferred for use in the potassium formate solution regeneration step.
Figure 4B:
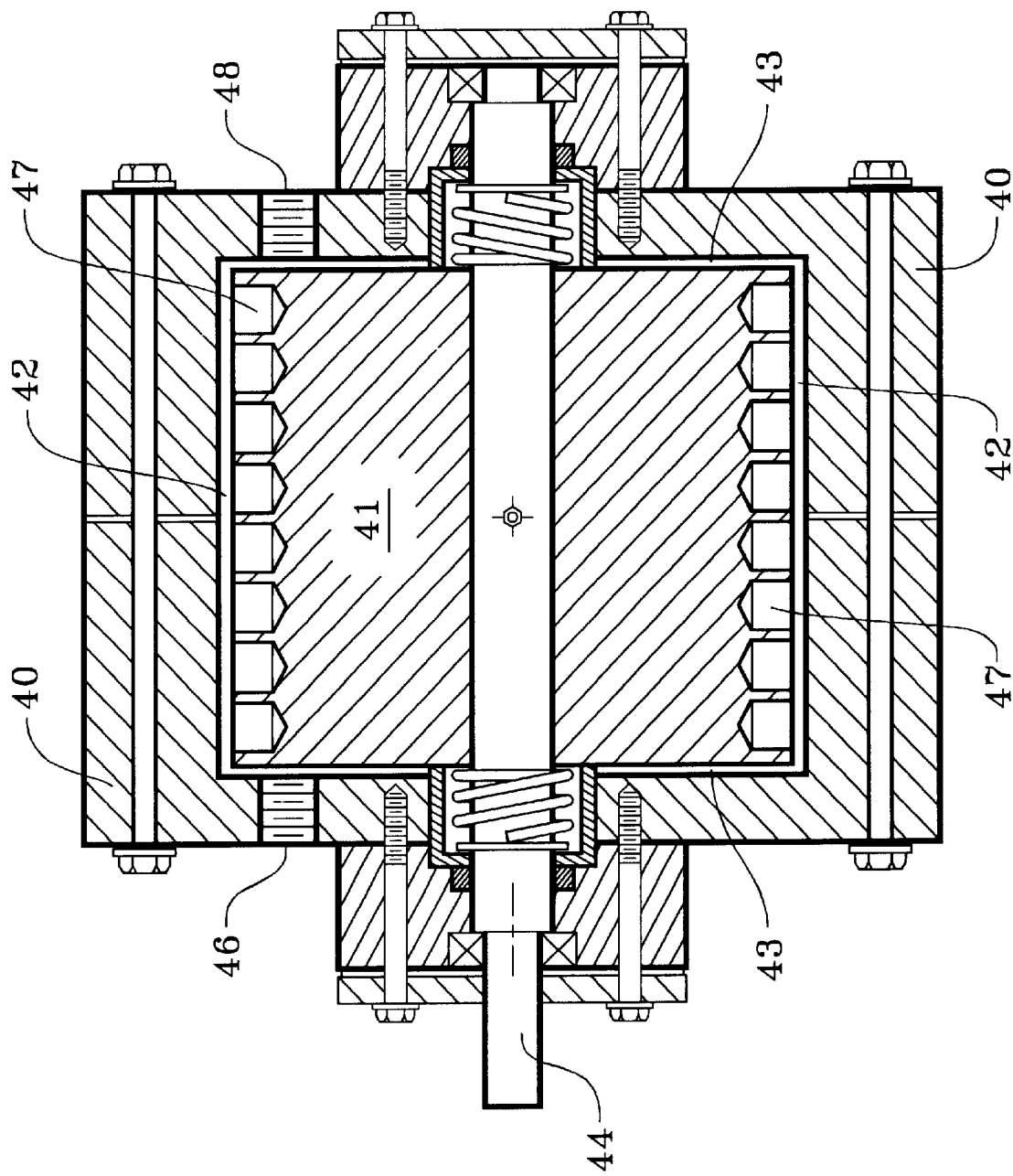

As my invention is shown in FIG. 2, wet gas is introduced through line 21 to a membrane separator 20, shown somewhat magnified to illustrate the membrane 22 and the porous membrane support 23. The magnified depiction of membrane separator 20 is adapted from FIG. 2 of Falk-Pedersen's U.S. Pat. No. 6,228,145, the entire specification of which is hereby incorporated by reference. Membrane support 23 is seen to have pores 24 of a size appropriate to permit the passage of water molecules from the gas side 25 of the membrane separator 20 to the solution side 26 of membrane separator 20. Membrane 22 is illustrated as a solid line, but membrane 22 has micropores which are able to pass water molecules from the water vapor in the gas but not other molecules from the gas, as discussed elsewhere herein. The wet gas is passed upwardly from line 21 in this illustration, preferably countercurrently, as illustrated, with respect to a (preferred) potassium formate solution on the obverse side of the membrane, causing moisture to pass from the gas through porous support 23 and membrane 22 to the potassium formate solution, which becomes diluted by virtue of picking up the moisture. Dry gas is recovered for use or further transmission through line 27. The dilute potassium formate solution is sent through line 32 to regenerator 29, which removes excess water from it and returns the relatively concentrated stream through line 30 for reuse in the membrane separator 20. Regenerator 29 may be a reboiler, another membrane separator, or preferably a cavitation pump such as is illustrated in FIGS. 4a and 4b. The liberated water is released through steam vent 31, and/or drained through a drain not shown, or saved for other uses as a water source.

Figure 3A:
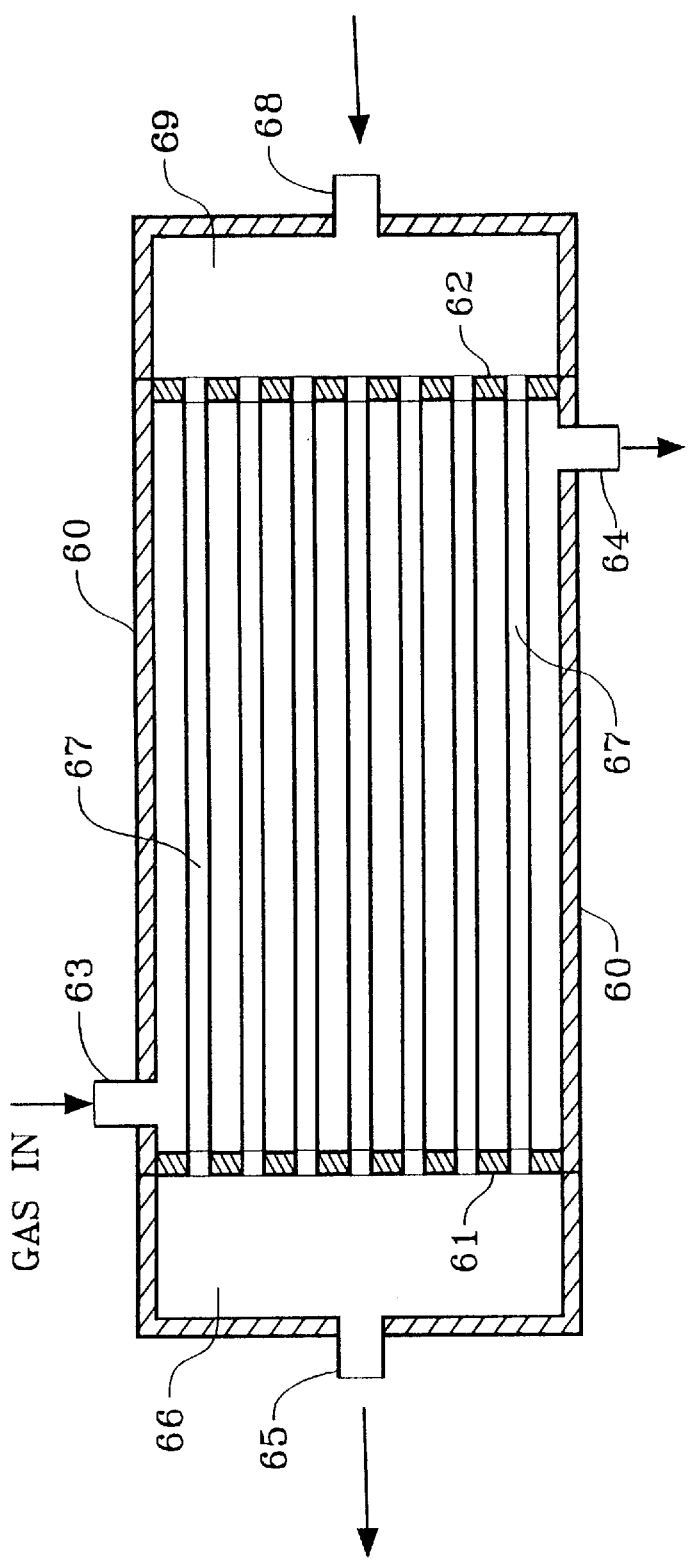
FIGS. 3a and 3b show a preferred module of a plurality of tubes used in my dehydrating process.
Figure 3B:
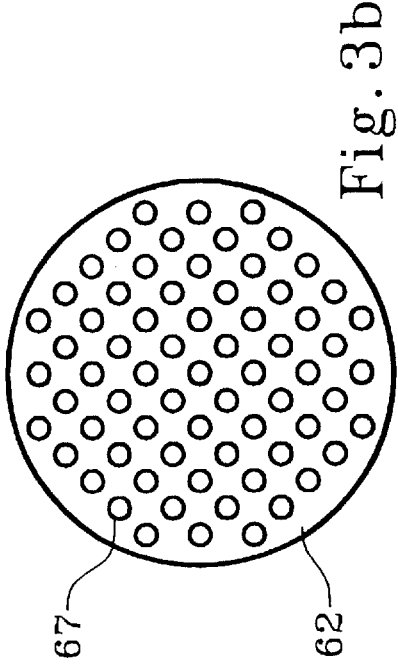

In FIGS. 3a and 3b, a preferred membrane separator is illustrated. FIG. 3a is a longitudinal section of the separator. The gas to be dried enters through entry port 63 and fills the vessel 60 completely between end plates 61 and 62 except for tubes 67. Tubes 67 are permeable rigid or semirigid tubes covered with membrane on the outside, so that the gas In the body of vessel 60 contacts the membrane. Tubes 67 connect to and pass substantially in parallel through end plates 61 and 62, communicating with manifolds 66 and 69. Potassium formate solution is directed from entrance 68 to manifold 69 and passes from right to left, as depicted, through tubes 67 to manifold 66 and out through exit 65, which is usually connected to a regenerator for the now dilute potassium formate solution. While in the vessel 60, moisture in the gas is caused to pass through the membrane on the tubes 67 and is absorbed by the potassium formate solution inside tubes 67, thereby diluting it. Dilute potassium formate solution in manifold 66 is circulated through exit 55 to a regenerating unit such as the regenerator indicated as 29 in FIG. 2. Gas dried in the vessel 60 leaves via exit port 64. FIG. 3b shows the face of end plate 62 and the open ends of tubes 67.

The membrane may be applied to the support in any known manner. A polymerizable solution, for example, may be coated on the surface of the porous tube to polymerize or otherwise set up to form the membrane in place. Alternatively, a preformed membrane sleeve may be passed over the porous tube and adhered thereto, similar to the two ply fabric described by Gore and Allen in U.S. Pat. No. 4,194,041, which is of interest herein.

A countercurrent circulation is preferred, generally as illustrated in FIG. 3a—that is, the fresh gas enters the dehydration zone on the shell side of the membrane tubes near the exit end of the tubes for the solution, and the freshly regenerated solution enters the membrane tubes near the exit end of the dehydration zone for the gas.

Alternatively, where an optional mode is used, freshly regenerated potassium formate solution enters the dehydration zone on the shell side of the exit end of the tubes and the gas to be dehydrated enters the interior of the tubes at the exit end of the dehydration zone for the solution on the exterior (shell) side of the tubes. Such countercurrent configurations are generally more efficient than other configurations in that the difference in concentration of water in the gas and in the potassium formate solution is significant throughout the length of the dehydration zone. That is, there is an efficient gradient of osmotic balance from one end of the separator to the other.

FIGS. 4a and 4b show two slightly different variations of a preferred regenerator unit for the potassium formate solution, defined herein as a cavitation regenerator. A housing 40 encloses cylindrical rotor 41 leaving only a small clearance 42 around its curved surface and small clearance 43 at the ends. The rotor 41 is mounted on a shaft 44 turned by motor 45. Cavities 47 are drilled or otherwise cut into the surface of rotor 41. As explained in the Griggs and Sajewski patents cited as being of particular interest above, other irregularities, such as shallow lips around the cavities 47, may be placed on the surface of the rotor 41. Some of the cavities 47 may be drilled at an angle other Than perpendicular to the surface of rotor 41—for example, at a 15 degree angle. Liquid—in the present invention, potassium formate solution—is introduced through port 46 under pressure and enters clearances 43 and 42. As the solution passes from port 45 to clearance 43 to clearance 42 and out exit 48, while rotor 41 turns, areas of vacuum are generated and heat is generated within the liquid from its own turbulence, expansion and compression (shock waves). As explained at column 2 lines 61 et seq in Grigge'U.S. Pat. No. 5,188,090, "(T)he depth, diameter and orientation of (the cavities) may be adjusted In dimension to optimize efficiency and effectiveness of (the cavitation pump) for heating various fluids, and to optimize operation, efficiency, and effectiveness . . . with respect to particular fluid temperatures, pressures and flow rates, as they relate to rotational speed of (the rotor 41)." Smaller or larger clearances may be provided (col. 3, lines 9–14). Also the interior surface of the housing 40 may be smooth with no irregularities or may be serrated, feature holes or bores or other irregularities as desired to increase efficiency and effectiveness for particular fluids, flow rates and rotational speeds of the rotor 41. (col. 3, lines 23–29) Rotational velocity may be on the order of 5000 rpm (col 4 line 13). The diameter of the exhaust port 48 or ports may be varied also depending on the fluid treated. Pressure at entrance port 46 may be 75 psi, for example, and the temperature at exit port 48 may be 300° F. Thus the potassium formate solution may be flashed or otherwise treated to remove the excess water as steam or water vapor. Treatment should be calculated to return a potassium formate solution of the concentration desirable for another cycle of water absorption from the natural gas in a membrane gas dryer as in FIG. 2.

Preferably, concentration of the potassium or other alkali metal formate at inlet port 46 is from 40% to 80%, more preferably from 60% to 80%, and most preferably 70% to 76% by weight. Generally, regeneration is most efficiently undertaken when the solution has absorbed sufficient water to reduce the potassium formate concentration to the range of about 55% to about 60%, but this will vary with conditions such as the original concentration of moisture in the gas, the type of regeneration unit used, the moisture transmission characteristics of the membrane, and the total surface area of the membrane.

The cavitation pump of FIGS. 4a and 4b is a preferred regeneration unit (see item 29 in FIG. 2) for the potassium formate solution used in my invention. After regeneration, the solution concentration is preferably in the same range as it was when first introduced to the apparatus. The process may be conducted continuously or intermittently.

Specifically, as applied to the potassium formate solution I prefer to use in my invention, or with respect to sodium or cesium formate, for example, operation of the cavitation regenerator of FIGS. 4a and 4b is as follows. A shearing stress is created in the potassium formate solution as it passes into the narrow space between the rotor 41 and the housing 40. This shearing stress causes an increase in temperature. The solution quickly encounters the cavities 47 in the rotor 41, and tends to fill the cavities, but the centrifugal force of the rotation tends to throw the liquid back out of the cavities, which creates a vacuum. Vacuum in a cavity 47 draws liquid back into it, and accordingly "shock waves" are formed as the cavities are constantly filled, emptied and filled again. Small bubbles, some of them microscopic, are formed and imploded. All of this stress on the liquid generates heat which increases the temperature of the liquid dramatically. The design of the cavitation pump (cavitation regenerator) ensures that, since the bubble collapse and most of the other stress takes place in the cavities 47, little or no erosion of the working surfaces of the rotor takes place, and virtually all of the heat generated remains within the liquid.

Temperatures within the cavitation regenerator—of the rotor 41, the housing 40, and the potassium formate solution within the clearance spaces 42 and 43 between the rotor and the housing—remain substantially constant after the process is begun and while the feed rate and other variables are maintained at the desired values. There is no outside heat source; it is the mechanical energy of the spinning rotor 41 that is converted to heat taken up by the solution and soon removed along with the solution when it is passes through exit 48 (FIG. 4a or 4b). The rotor and housing indeed tend to be lower in temperature than the liquid in clearances 42 and 43. There is little danger of scale formation even with high concentrations of potassium formate in the solution being processed.

Definition: As used herein, the term "cavitation regenerator" includes the above described cavitation pump, including that of FIGS. 4a and 4b sometimes referred to as a shock wave pump. It includes the Hydrosonic Pump™ made by Hydro Dynamics, Inc. of Rome, Ga. It includes all of the devices capable of heating liquids between two shearing surfaces described in the six Sajewski and Griggs patents incorporated by reference above; preferably shearing surfaces include a rotor having cavities or other irregularities. And, the term "cavitation regenerator" includes any device or method capable of heating a potassium formate solution by mechanical shearing rather than by an external source of heat to be passed through a heat exchange surface. Such devices and methods include the use of shock waves, cavitation, and/or other turbulent action generated between two close and oppositely moving surfaces, as explained above.

The gas will commonly be under pressure from a gas transmission line, and this pressure can be maintained or modified while it passes through the membrane dehydration unit. As is known in the art, the exterior of a permeable tube is called the shell side. Where the fluid on the shell side is the gas to be dehydrated, it is preferably maintained under pressure as it passes through the membrane dehydration zone. The potassium formate solution inside the tubes need not be under any applied pressure except that required to move it to the regeneration zone.

Any practical combination of regeneration zone dimensions, pressures, residence times and other engineering variables may be used to accomplish the objective of dehydrating the gas efficiently.

After regeneration, the potassium or other alkali metal formate solution may optionally be cooled before it is sent back to the gas dehydration zone. Cooling may be accomplished simply by atmospheric heat exchange or by more elaborate means known in the art.

Thus it is seen that my invention includes a method of drying natural gas comprising placing the natural gas in contact with a membrane capable of passing water in the gas through the membrane, the membrane being coated on a permeable tube, and placing an aqueous solution comprising alkali metal formate, preferably potassium formate, in contact with a second side of the membrane, whereby water from the gas passes through the membrane and is absorbed by the potassium formate solution, and thereafter regenerating the potassium formate solution by removing water therefrom.

My invention also includes a method of drying natural gas comprising placing the natural gas in contact with a first side of a membrane capable of passing water from the gas through the membrane, and placing an aqueous solution comprising potassium formate in contact with a second side of the membrane, whereby moisture from the gas passes through the membrane and is absorbed by the potassium formate solution. It also includes a method of drying natural gas comprising placing the natural gas in contact with a membrane capable of transmitting water from the gas through the membrane while substantially excluding methane from transmission, the membrane being coated on a permeable tube, placing an aqueous solution comprising potassium formate in contact with a second side of the membrane, whereby moisture from the gas is transmitted through the membrane and is absorbed by the potassium formate solution, and thereafter regenerating the potassium formate solution by removing water therefrom. In addition, my invention includes a method of dehydrating a gas containing moisture comprising substantially continuously passing the gas in contact with a surface of a membrane capable of transmitting moisture from the gas through the membrane, substantially continuously passing a potassium formate solution in contact with the obverse surface of the membrane, the gas being passed in a once-through mode and the potassium formate being passed in a circulating mode, whereby moisture is transmitted from the gas through the membrane and absorbed by the potassium formate solution, the circulating mode including regenerating the potassium formate solution by removing water therefrom and returning the potassium formate solution to the obverse surface of the membrane.

What is claimed is:

1. Method of drying natural gas comprising placing said natural gas in contact with a first side of a membrane capable of passing water from said gas through said membrane, and placing an aqueous solution comprising potassium formate in contact with a second side of said membrane, whereby moisture from said gas passes through said membrane and is absorbed by said potassium formate solution, thereby forming a diluted solution of potassium formate, followed by regenerating said diluted solution of potassium formate to obtain a solution comprising from 40% to 80% potassium formate, followed by placing said solution comprising 40% to 80% potassium formate in contact with said second side of said membrane.

2. Method of claim 1 wherein said solution contains from 60 to 80% potassium formate by weight.

3. Method of claim 2 wherein said solution contains from 70 to 76% potassium formate by weight.

4. Method of claim 1 wherein said regenerating comprises removing water from said potassium formate solution by a cavitation regenerator.

5. Method of claim 1 wherein said membrane is supported on a permeable tube.

6. Method of claim 5 wherein said potassium formate solution is caused to flow on the outside of said tube and said natural gas is caused to flow on the inside thereof, countercurrently to said solution.

7. Method of claim 5 wherein said potassium formate solution is caused to flow on the inside of said tube and said natural gas is caused to flow on the outside thereof, countercurrently to said solution.

8. Method of drying natural gas comprising placing said natural gas in contact with a membrane capable of transmitting moisture from said gas through said membrane while substantially excluding methane from transmission, said membrane being on a permeable tube, placing an aqueous solution comprising 40–80% potassium formate in contact with a second side of said membrane, whereby moisture from said gas is transmitted through said membrane and is absorbed by said potassium formate solution, and thereafter regenerating said potassium formate solution by removing water therefrom to form a regenerated solution comprising 40–80% potassium formate.

9. Method of claim 8 wherein said membrane is on the outside of said tube and said gas is placed in contact with it on the outside of said tube.

10. Method of claim 8 wherein said membrane is on the inside of said tube and said gas is placed in contact with it on the inside of said tube.

11. Method of claim 8 wherein said solution is passed through a plurality of tubes in parallel including said membrane, and said gas is passed countercurrently to said solution.

12. A Method of claim 8 wherein said regenerated solution is used in at least one iteration of the method of claim 8.

13. Method of claim 8 wherein said membrane has a moisture transmission rate exceeding 1000 $g/m^2/day$.

14. Method of claim 8 wherein said membrane permits no detectable flow of liquid water at hydrostatic pressures up to 172 $kN/m^2$.

15. Method of dehydrating a gas containing moisture comprising substantially continuously passing said gas in contact with a surface of a membrane capable of transmitting moisture from said gas through said membrane, substantially continuously passing a solution comprising 40% to 80% potassium formate in contact with the obverse surface of said membrane, said gas being passed in a once-through mode and said potassium formate solution being passed in a circulating mode, whereby moisture is transmitted from said gas through said membrane and absorbed by said potassium solution, said circulating mode including regenerating said potassium formate solution by removing water therefrom to form a regenerated solution containing 40–80% potassium formate and returning said regenerated potassium formate solution to the obverse surface of said membrane.

16. Method of claim 15 conducted using a plurality of membranes substantially simultaneously.

17. Method of claim 15 wherein said gas Is natural gas.

* * * * *